Figure 1:
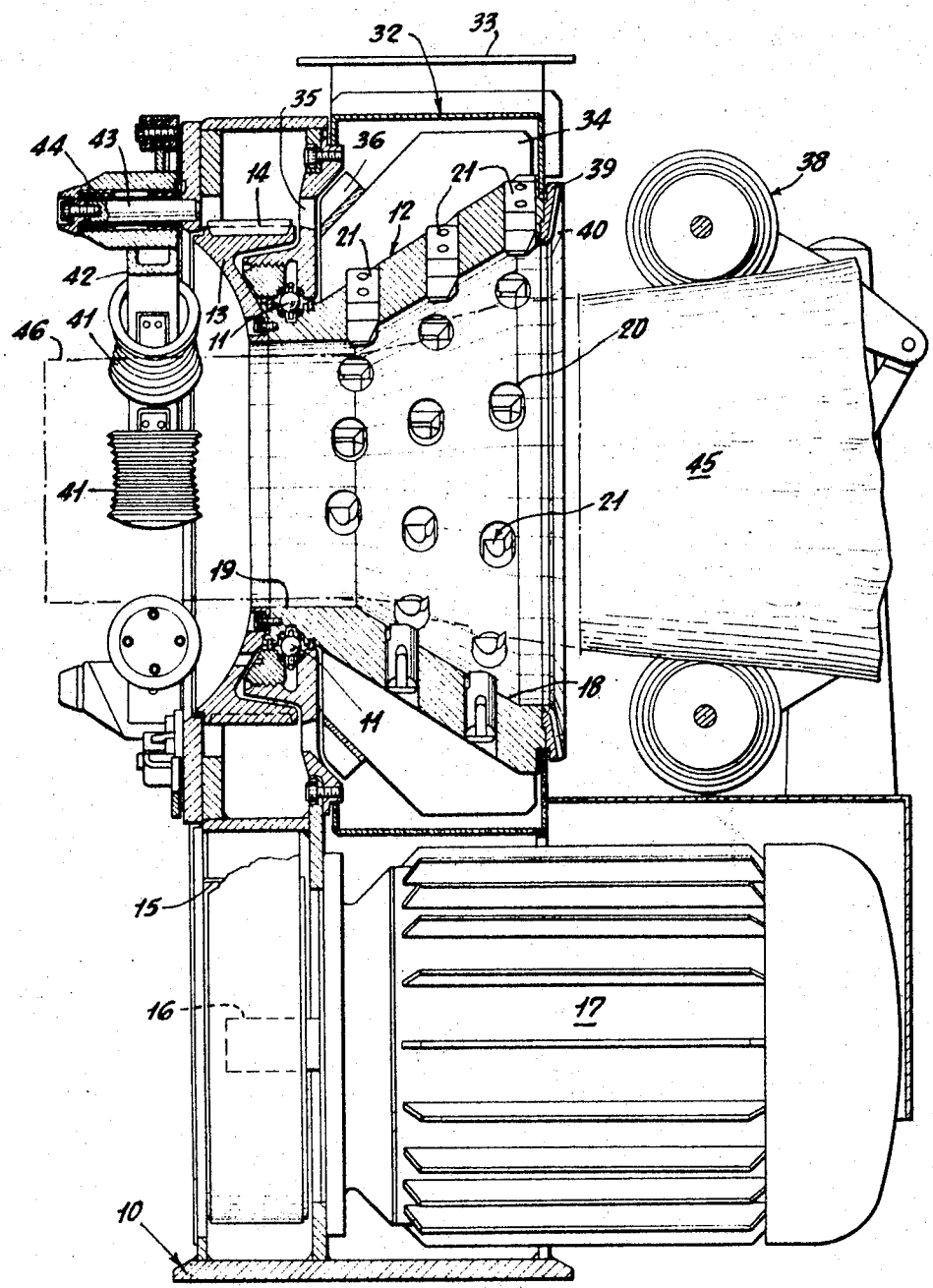

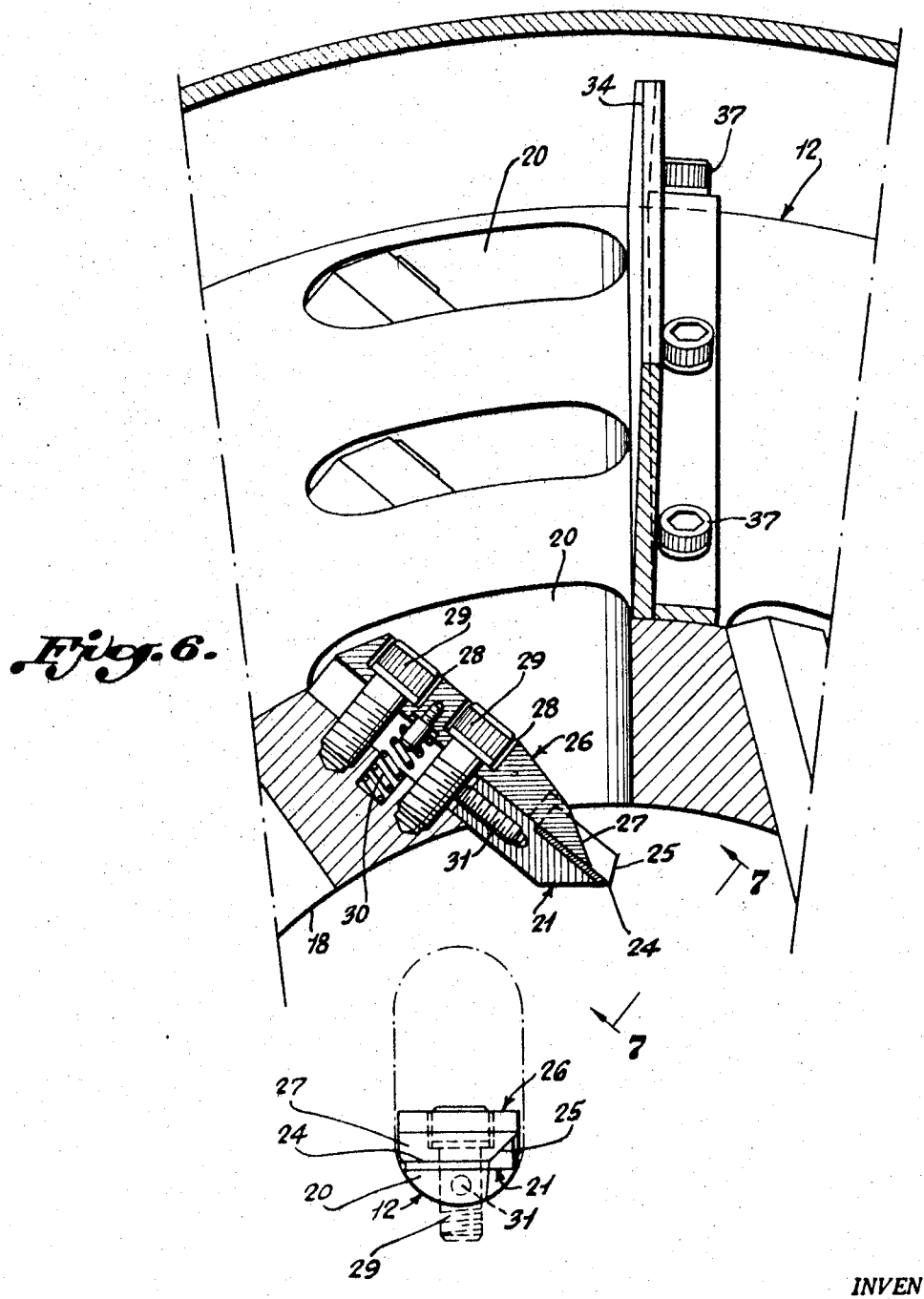

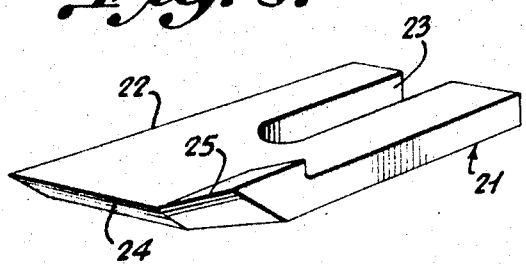
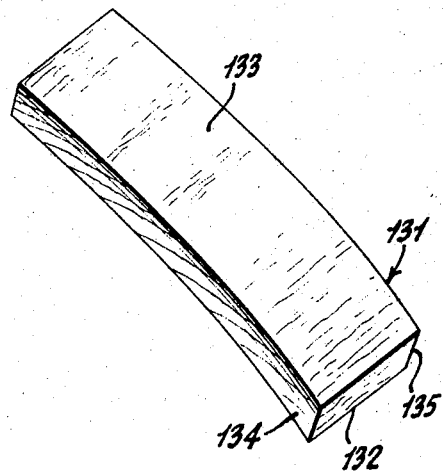
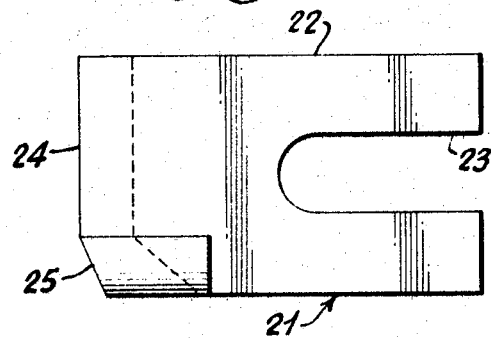
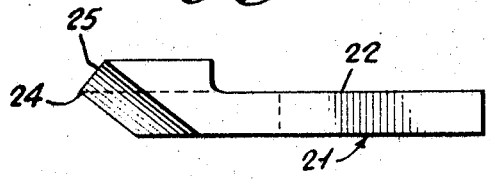
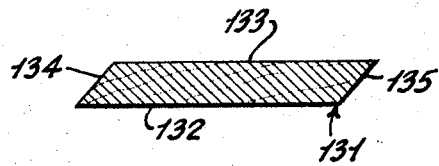
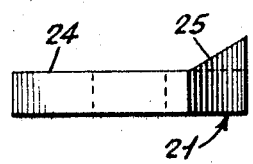

Aug. 19, 1969     H. W. WEXELL     3,461,931
APPARATUS FOR THE PRODUCTION OF WOOD CHIPS FROM LOGS
Filed Aug. 14, 1964     11 Sheets-Sheet 7

INVENTOR
H. W. WEXELL

BY
ATTORNEYS

INVENTOR.
H. W. WEXELL
BY
ATTORNEYS

Aug. 19, 1969  H. W. WEXELL  3,461,931
APPARATUS FOR THE PRODUCTION OF WOOD CHIPS FROM LOGS
Filed Aug. 14, 1964  11 Sheets-Sheet 10

INVENTOR
H. W. WEXELL

BY *Glascock, Downing & Seebold*
ATTORNEYS

Aug. 19, 1969   H. W. WEXELL   3,461,931
APPARATUS FOR THE PRODUCTION OF WOOD CHIPS FROM LOGS
Filed Aug. 14, 1964   11 Sheets-Sheet 11

INVENTOR.
H. W. WEXELL
BY
Glascock, Downing & Seebold
ATTORNEYS

United States Patent Office 3,461,931
Patented Aug. 19, 1969

3,461,931
APPARATUS FOR THE PRODUCTION OF WOOD CHIPS FROM LOGS
Harry W. Wexell, Gavle, Sweden, assignor to Brundell & Jonsson Aktiebolag, Gavle, Sweden
Filed Aug. 14, 1964, Ser. No. 389,536
Claims priority, application Sweden, Aug. 19, 1963, 9,040/63
Int. Cl. B27c 1/00, 9/00
U.S. Cl. 144—162      52 Claims This invention relates to woodworking and more particularly to an apparatus for the production of wood chips from logs. As a secondary consideration, the apparatus of this invention may be utilized for reducing a tapered log to a cylindrical bolt to be subsequently sawed into boards or into other shapes and the material removed from the log is in the form of usable chips, thereby reducing waste to a minimum.

It has been found that the character of chips utilized in the production of wood pulp has a material bearing on the quality of such pulp, particularly as regards the strength thereof and it has further been found that the quality of the pulp is materially improved by utilizing chips in which there is substantially no distortion or displacement of the wood fibers, one with respect to the other.

Heretofore, in the production of wood chips, the primary consideration has been the rapid reduction of a log to chip form without any particular concern as to the uniformity of the chips produced with respect to dimensions and also no particular consideration has been given to the matter of preventing distortion or displacement of the fibers in the chips.

Admittedly, some attempts have heretofore been made to produce high quality chips having uniform characteristics, such as uniform widths and thickness and also having undistorted fibers and such chips have been produced at least on an experimental basis, by utilizing a conventional veneer lathe to cut sheets from a log with such sheets being thereafter cut into chip form. The chips produced in this manner result in providing pulp of superior characteristics, but this method of production has no practical utility, since the same is relatively slow, requires both a veneer lathe and apparatus to cut the resulting veneer into chips and furthermore, after the maximum quantity of veneer has been removed from the log a core remains which must either be discarded or utilized in some other manner.

A further attempt has been made to solve this problem by the provision of a so-called "drum chipper" which takes the form of a relatively large cylindrical drum mounted for rotation on a horizontal shaft and with cutters projecting from the periphery of the drum. The drum is rotated at a relatively slow speed and logs are forced transversely against the side of the drum which results in the cutting of strips crosswise of the log by the cutters and such cuts are generally parallel to the direction of the fibers in the log. These strips which have a substantially uniform thickness pass through slits into the interior of the drum against the action of centrifugal force and are discharged from the drum through one or both ends. The resulting chips are only uniform as to thickness, the other dimensions being variable and while such chips are superior to those previously produced by conventional chipping apparatus there are serious disadvantages to this type of chipping apparatus, in that for an acceptable production rate the apparatus must be relatively large and, therefore, costly and furthermore, the logs utilized therewith must be of substantially uniform relatively short lengths and also the power requirements for such an apparatus are relatively large.

Briefly stated, the apparatus of this invention may in one form include, a hollow frusto-conical head mounted for rotation about a horizontal axis and the head is provided with a conical inner surface merging into a cylindrical inner surface adjacent the end of small diameter. A plurality of substantially radial apertures are provided in the head with such apertures being disposed in a spiral helical path extending from the cylindrical surface to a point adjacent the large end of the head and a cutter is secured to the head in each aperture. Each of these cutters is provided with a shaving edge disposed substantially parallel to the axis of the head and with a parting edge disposed at an angle to the shaving edge. A log is fed longitudinally through the head, with the result that the cutters engage and cut material from the log at different diameters with the shaving edges cutting substantially parallel to the fibers in the log and with the parting edges cutting across the fibers at an angle thereto. The chips are discharged radially outwardly through the apertures in the head, the movement of such chips being materially facilitated by centrifugal force and for this reason, the power requirements are materially reduced as compared to chipping apparatus in which the chips are discharged against the action of centrifugal force. In this form of the invention, the tapered log is reduced to a cylindrical bolt, the diameter of which is determined by the location of the innermost cutter and such bolts may, thereafter, be utilized for any desired purpose, such as for sawing into boards. Since the material removed from the log to provide the cylindrical bolt is in the form of high quality usable chips, waste is reduced to a minimum.

In another form of the invention for use in reducing an entire log to chips there is again provided a hollow conical head closed at one end and having only a conical inner surface. In this case, radial apertures are provided in the same manner as described above, such apertures being disposed in a spiral helical path and with a cutter secured in each aperture. In this case a log is fed longitudinally into the head but offset from the axis thereof in such a manner that the entire leading end of the log is engaged by the cutters and in this manner, the entire log is reduced to chips of the same characteristics as those described above in connection with the first form of the invention. In this form of the invention a single log may be fed longitudinally into the head or a plurality of logs may be simultaneously fed thereto, thereby increasing the production rate, but, of course, this also increases the power requirements. The cutting head in this form of the invention may be disposed on a horizontal axis or, if desired, the same may be disposed on a vertical axis with the log fed downwardly thereto, but in both cases, the chips are again discharged radially outwardly in the direction of centrifugal force.

In a further form of the invention and in order to reduce the overall size of the apparatus necessary to accommodate logs of relatively large diameter, there may be provided a head in the form of a hollow cylinder mounted for rotation about a horizontal axis, such cylinder being provided with substantially radial apertures disposed in a helical path. A cutter is secured to the head in each aperture with the cutting edges thereof projecting inwardly of the inner cylindrical surface of the cylinder and in this case, the shaving edges of the cutters are disposed at an angle to the axis of the head and with the parting edges disposed at an angle to the shaving edges in the same manner as described above. A log is fed longitudinally of the length thereof into the cylindrical head, but at an angle to the axis thereto which is substantially equal to the angle of the shaving edges with respect to the axis of the head. As a result, the cutters engage the entire leading end of the log to reduce the entire log to chips and as a result of the disposition of the log with respect to the cutters, the shaving edges cut substantially parallel to the fibers in the log and the parting edges cut across the fibers at an angle thereto. As before, the chips are discharged radially outwardly through the apertures in the drum with such movement of the chips being facilitated by centrifugal force. By reason of the angular disposition of the log with respect to the axis of the head, a log of substantially larger diameter may be accommodated by a head of given diameter than is the case where a log is fed parallel to the axis of a conical head but offset from the axis thereof, as in the previously described form of the invention and by reason of the smaller physical dimensions resulting from this form of the invention, the same is particularly adapted for portable use.

As has been heretofore mentioned, the chip produced by the apparatus and method of this invention is of superior quality and such chip represents a new article of manufacture in which the chip is of substantially uniform width and thickness having substantially concentric inner and outer parallel surfaces which are substantially surfaces of revolution and parallel conical end surfaces, whereby the cross section of the chip in a plane passing through the axis of the inner and outer surfaces is in the form of a parallelogram and with the fibers in the chip being substantially parallel to such axis and the fibers also being substantially free throughout their length from lateral distortion and displacement relative to each other.

It is accordingly an object of the invention to provide an apparatus for the production of wood chips from logs, which apparatus operates to provide a chip of superior characteristics, which chips may be produced at a relatively rapid rate and with minimum power requirements partially due to the fact that chips are discharged in a radial direction assisted by centrifugal force.

A further object of the invention is the provision of an apparatus for the production of chips from logs, which apparatus serves to accommodate logs of any length and also over a relatively wide range of diameters.

A still further object of the invention is the provision of an apparatus for reducing a tapered log to a cylindrical bolt, the material removed from the log being in the form of usable chips of uniform width and thickness, thereby reducing waste to a minimum.

Another object of the invention is the provision of an apparatus for reducing an entire log to usable chips of substantially uniform width and thickness.

A further object of the invention is the provision of an apparatus for reducing an entire single log to usable chips of substantially uniform width and thickness.

A still further object of the invention is the provision of an apparatus for simultaneously reducing a plurality of logs to usable chips of substantially uniform width and thickness.

Figure 2:
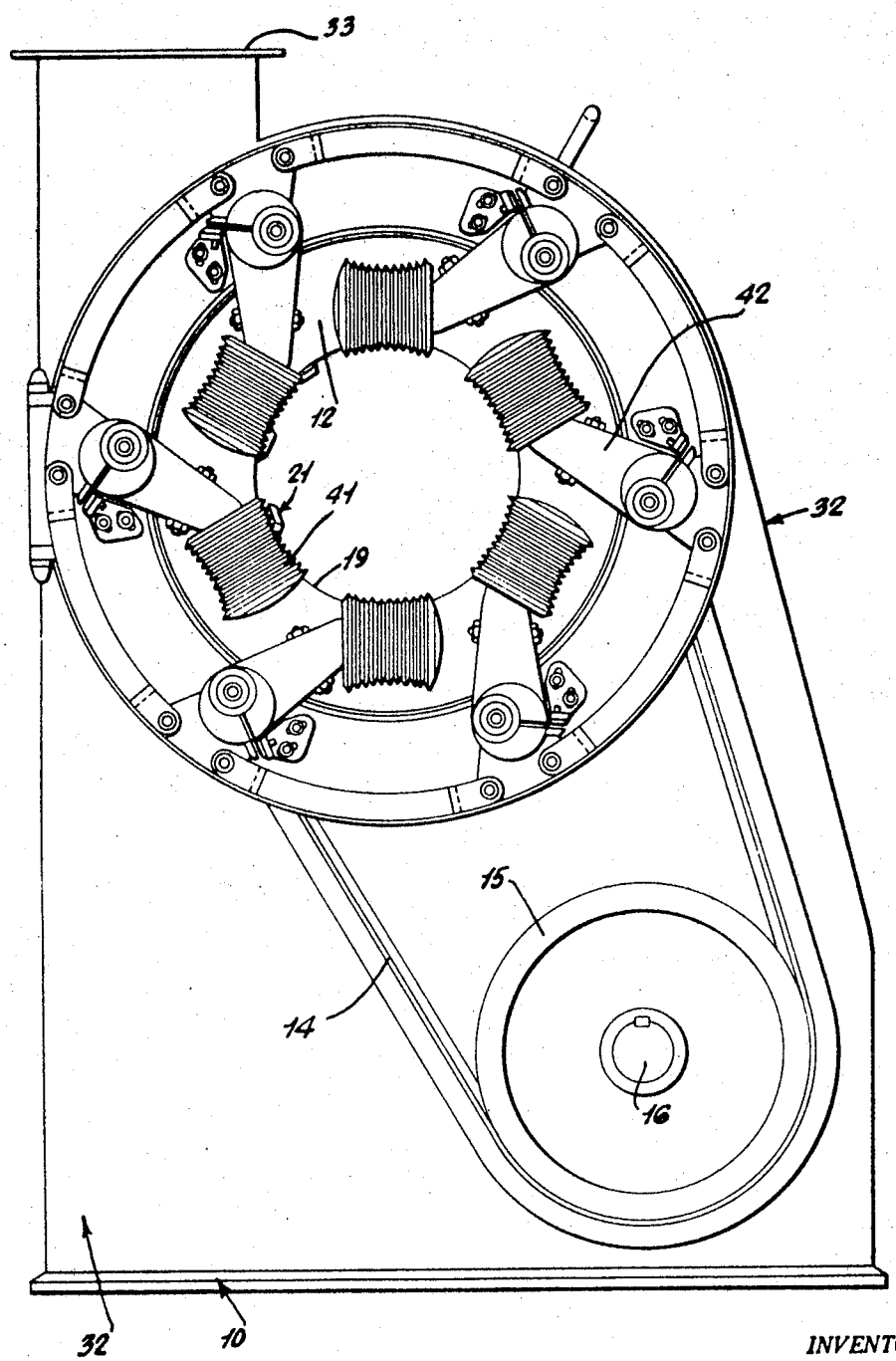
Figure 3:
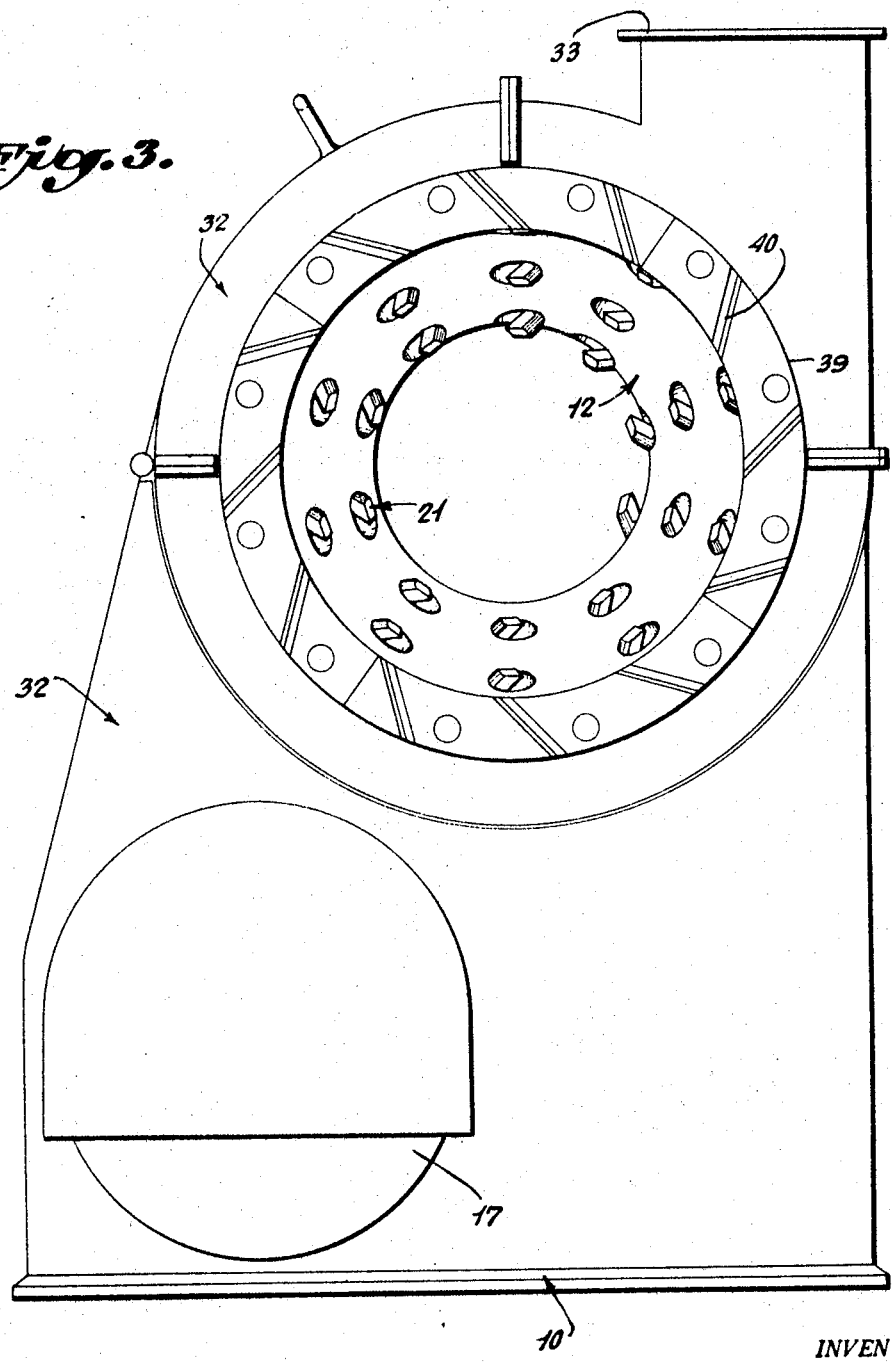
Figure 4:
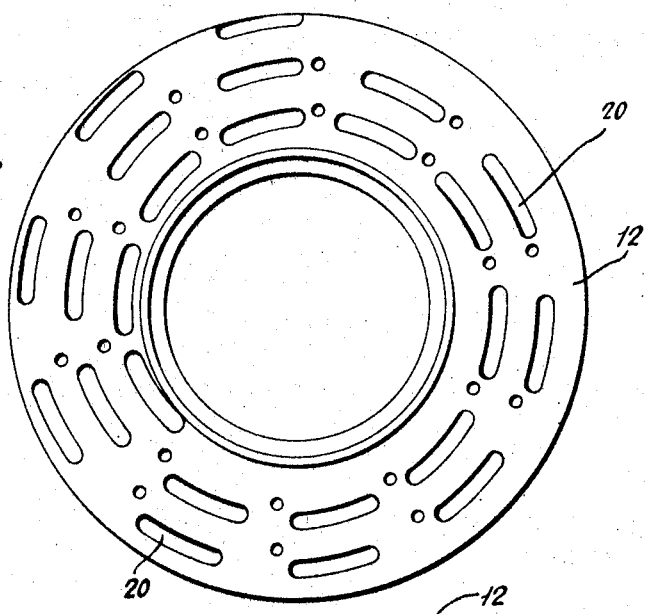
Figure 5:
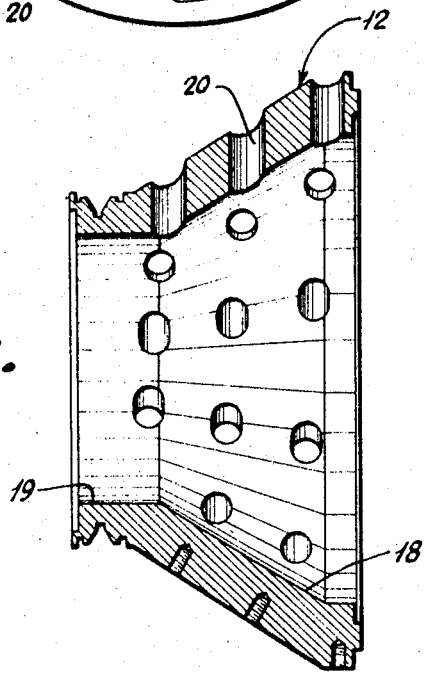
Figure 12:
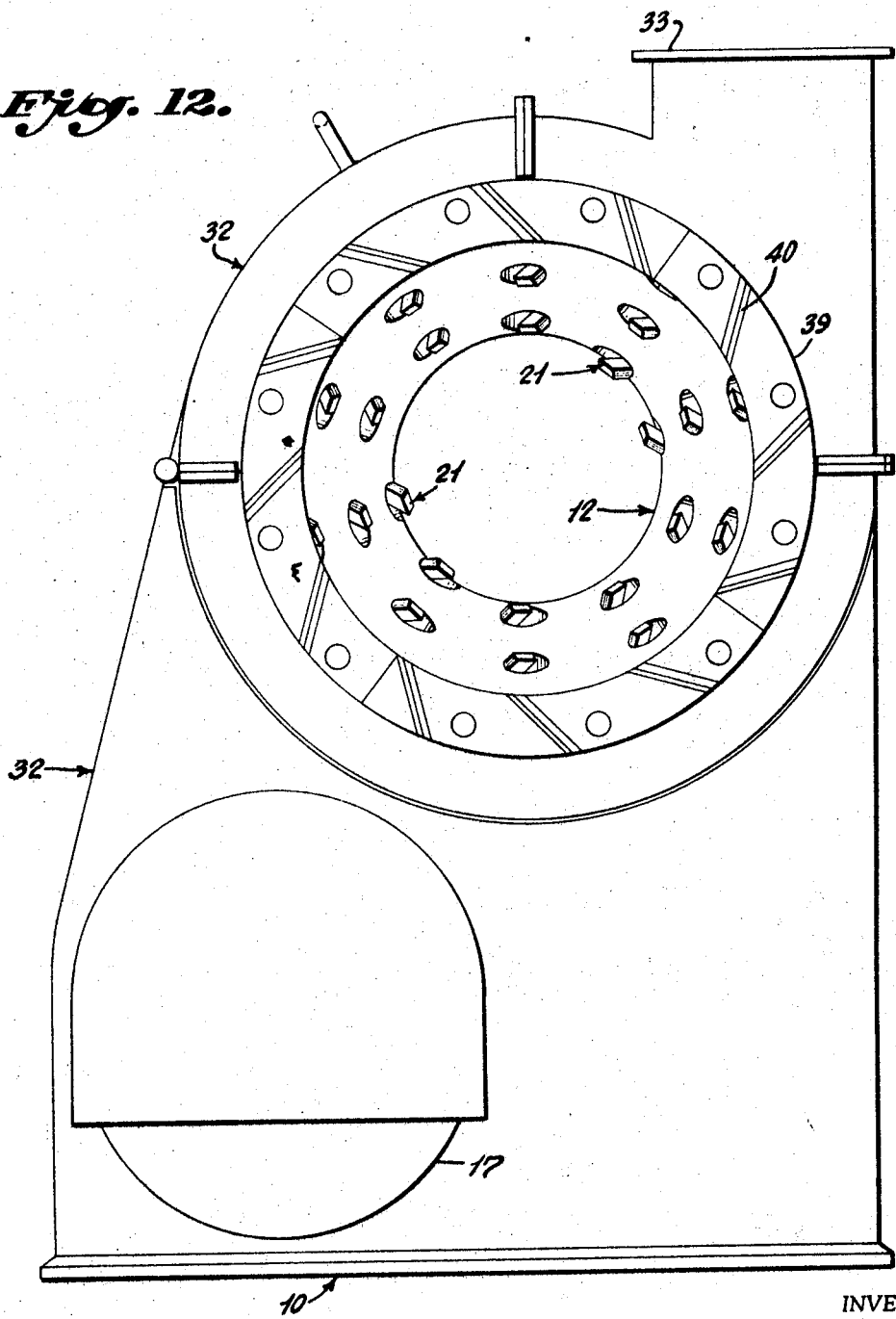
Figure 13:
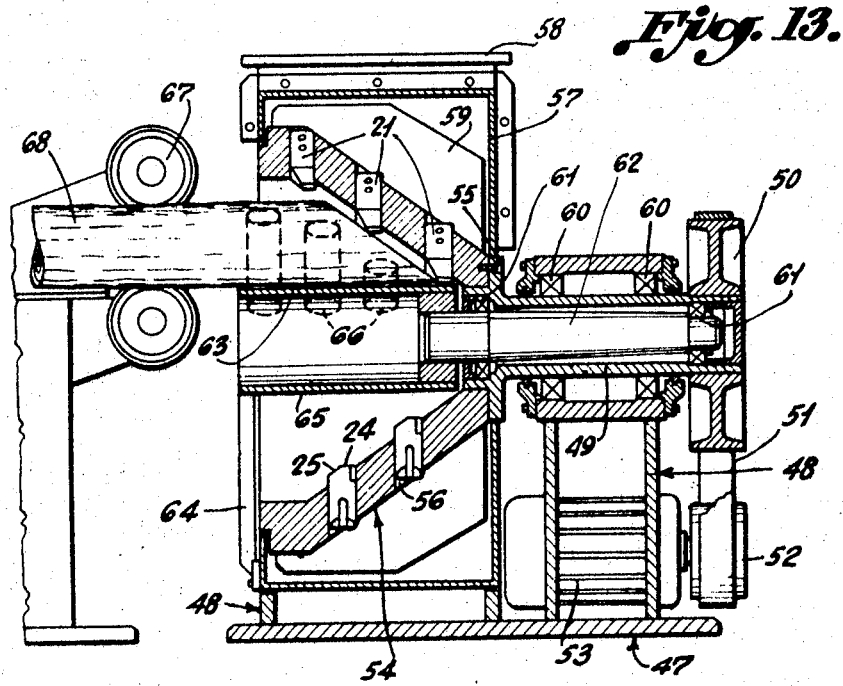
Figure 14:
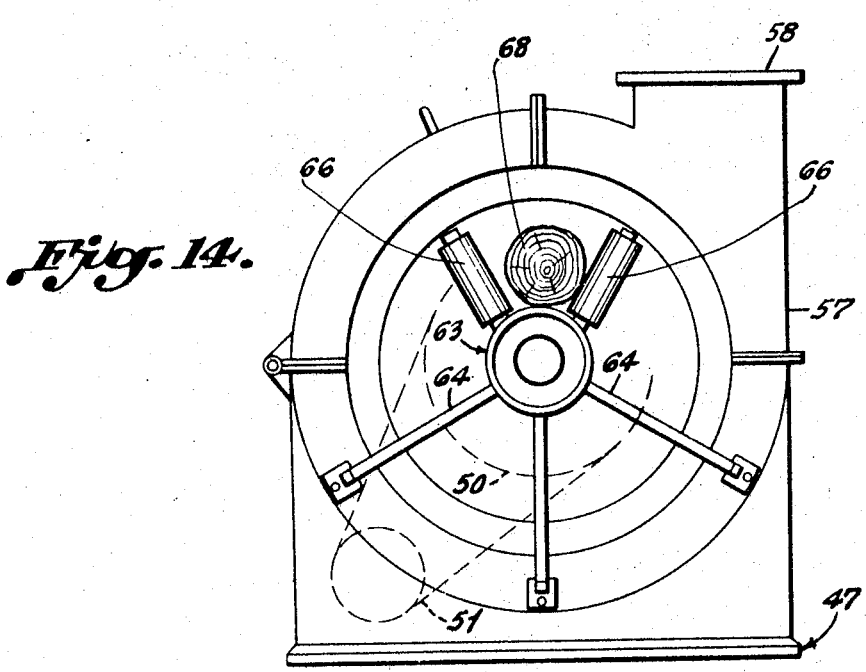
Figure 15:
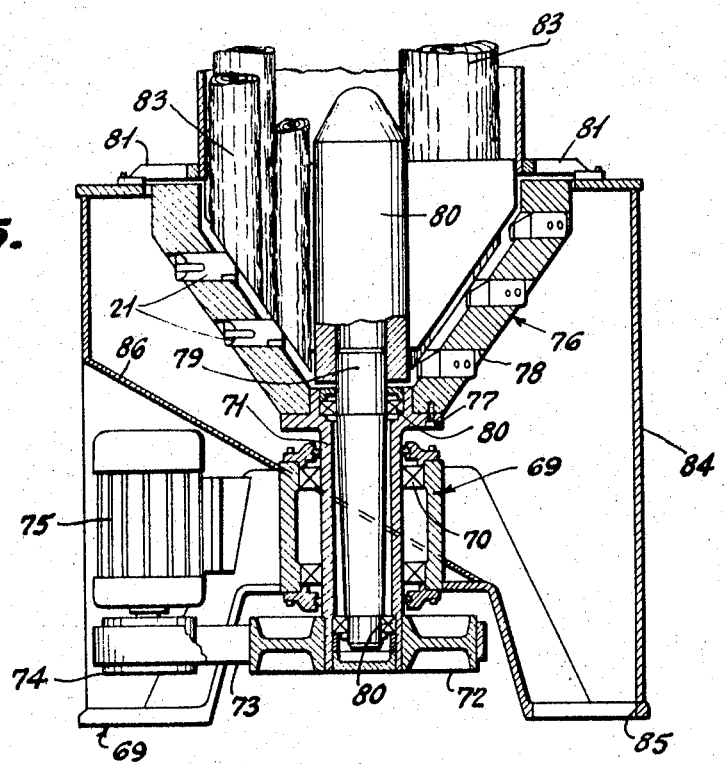
Figure 16:
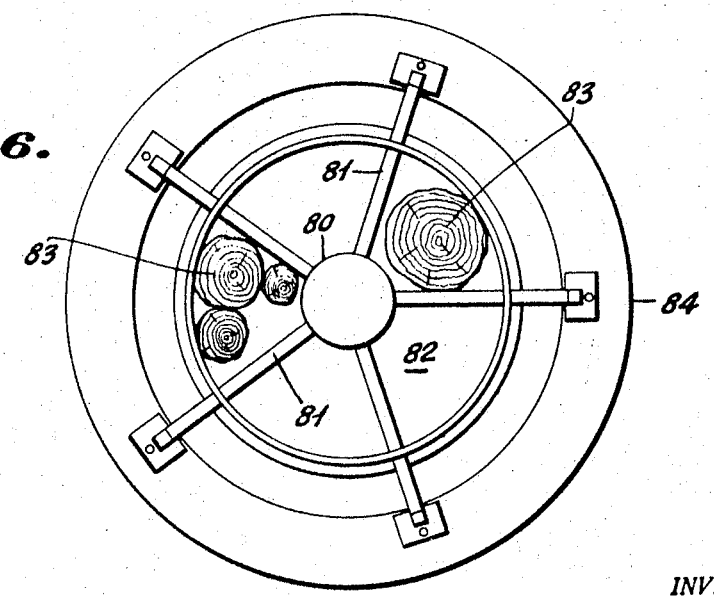
Figure 17:
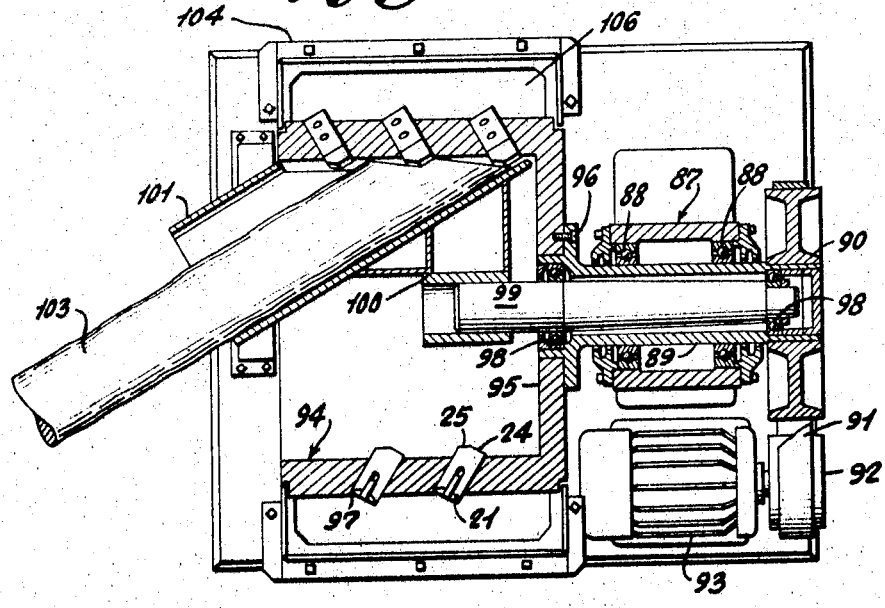
Figure 18:
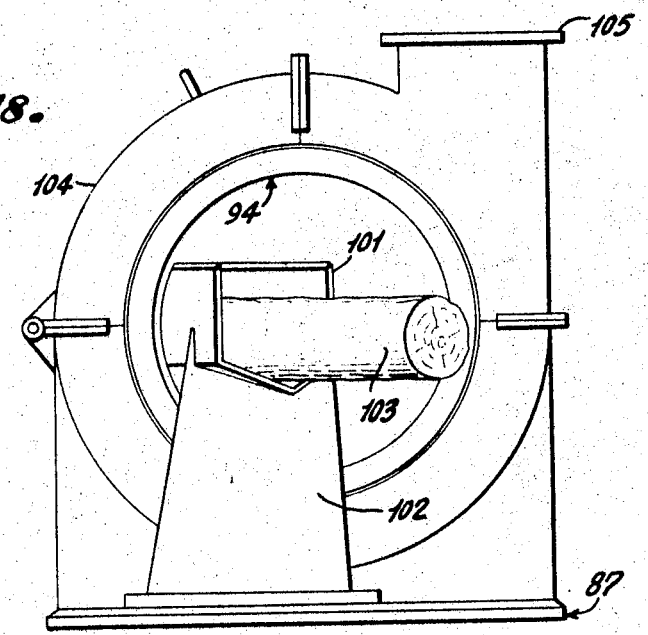
Figure 19:
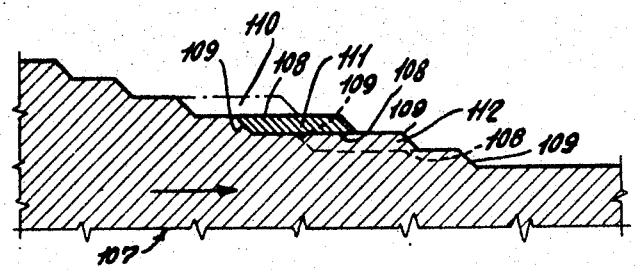
Figure 20:
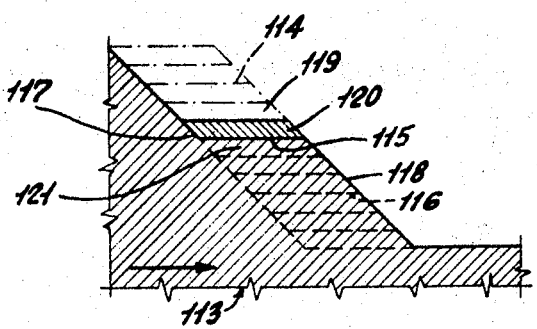
Figure 21:
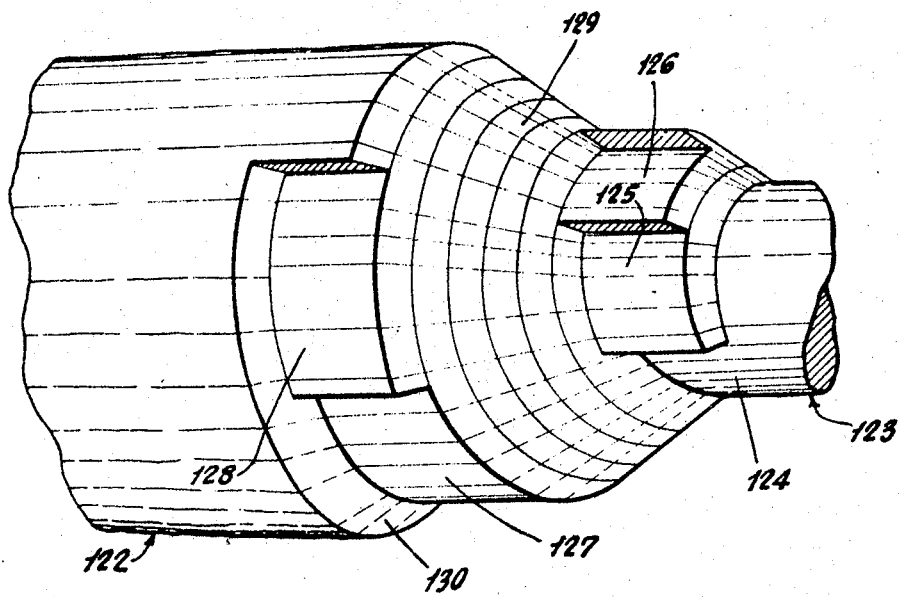

Further objects and advantages of the invention will be apparent from the following description taken in conjunction with the accompanying drawings wherein:

FIG. 1 is a longitudinal sectional view showing an apparatus constructed in accordance with this invention for reducing a log to a cylindrical bolt and for providing usable chips;

FIG. 2 an elevational view looking at the out-feed side of the apparatus and showing the bolt guiding means;

FIG. 3 an elevational view from the in-feed side of the apparatus and showing the arrangement of the cutters in the conical cutting head;

FIG. 4 an end elevational view showing the exterior of the cutting head utilized in the apparatus of FIG. 1;

FIG. 5 a transverse sectional view of the head shown in FIG. 4;

FIG. 6 a fragmentary elevational view with parts broken away and in section and showing a portion of the cutting head, together with the manner of securing a cutter in one of the apertures in the head;

FIG. 7 a fragmentary end elevational view showing the cutter and mounting means and taken along the line 7—7 of FIG. 6;

FIG. 8 a view in perspective showing the cutter utilized in the apparatus of this invention;

FIG. 9 a top plan view of the cutter shown in FIG. 8;

FIG. 10 an end elevational view showing the relationship of the shaving and parting edges of the cutter of FIG. 8;

FIG. 11 a side elevational view of the cutter shown in FIG. 8;

FIG. 12 an elevational view, similar to FIG. 3, from the in-feed side of the apparatus but showing a double spiral helical arrangement of cutters in the head;

FIG. 13 a longitudinal sectional view showing a modified form of the invention, together with the manner of feeding a log to reduce the entire log to chips;

FIG. 14 an end elevational view looking from the in-feed end of the apparatus shown in FIG. 13;

FIG. 15 a sectional view showing an apparatus similar to FIG. 13, but with the cutting head disposed on a vertical axis and showing the manner in which a plurality of logs may be simultaneously reduced to chips;

FIG. 16 a top plan view of the apparatus shown in FIG. 15;

FIG. 17 a horizontal sectional view showing a still further modified form of the apparatus utilizing a cutting head in the form of a hollow cylinder and showing the manner in which a log is fed thereto;

FIG. 18 an end elevational view taken from the in-feed end of the apparatus of FIG. 17;

FIG. 19 a fragmentary sectional view showing a portion of a log and the manner in which helical chips are removed therefrom;

FIG. 20 a fragmentary sectional view showing a log and the manner in which helical chips are removed therefrom with a different arrangement of cutters than shown in FIG. 19;

FIG. 21 a view in perspective showing a portion of a log and the manner in which helical chips are removed therefrom by the apparatus of this invention;

FIG. 22 a view in perspective showing the chips produced by the apparatus of this invention; and FIG. 23 a sectional view showing the cross sectional shape of the chips shown in FIG. 22.

With continued reference to the drawing and particularly FIGS. 1 to 11, there is shown an apparatus constructed in accordance with this invention for reducing a log to a cylindrical bolt and for producing usable chips of substantially uniform width and thickness, which apparatus comprises a frame 10 provided with suitable bearings 11 for rotatably mounting a frusto-conical head 12 therein on a horizontal axis. Secured to the small end of the head 12 is a pulley 13 engaging a belt 14 which is trained over a pulley 15 mounted on the drive shaft 16 of a drive motor 17 mounted in the frame 10.

The frusto-conical head 12 is provided with a conical inner surface 18 which merges into a cylindrical inner surface 19 adjacent the end of smaller diameter. As clearly shown in FIGS. 1, 4 and 5, the head 12 is provided with a plurality of circumferentially elongated substantially radial apertures 20 extending therethrough and these apertures are disposed in a spiral helical path extending from the cylindrical surface 19 to a point adjacent the large end of the head 12.

The head 12 serves to receive and support cutters in the apertures 20 and as best shown in FIGS. 8 to 11, each cutter 21 may be of elongated generally rectangular configuration having a shank portion 22 provided with an elongated slot 23 therein and terminating in a shaving edge 24 extending at right angles to the length of the cutter. Adjacent one edge of the cutter 21 at an end of the shaving edge there is provided a parting edge 25 which is disposed at an angle to the shaving edge 24 providing an obtuse included angle between the shaving edge and the parting edge. The manner in which this cutter operates will be later described.

As best shown in FIGS. 6 and 7, a cutter 21 is disposed in an aperture 20 of the head 12 and the cutting edges 24 and 25 of the cutter 21 project inwardly of the head 12. A chip breaker 26 is positioned on the shank portion 22 of the cutter 21 and the chip breaker 26 terminates in a tapered portion 27 disposed inwardly of the shaving edge 24. Apertures 28 are provided in the chip breaker 26 in alignment with the slot 23 of the cutter 21 and the apertures 28 serve to receive screw threaded fastening means 29. The fastening means 29 extend through the slot 23 in the cutter 21 and are threadedly received in the head 12 to securely clamp the cutter 21 in place in the aperture 20. In order to facilitate release of cutter 21 for adjustment or replacement purposes, there may be provided a compression spring 30 disposed between the head 12 and the chip breaker 26 which operates to move the chip breaker 26 away from the cutter 21 upon release of the fastening means 29. Since it is desirable to provide for radial adjustment of the cutter 21, there may be provided screw threaded adjusting stop means 31 threadedly received in the cutter 21 and projecting into the inner end of the slot 23 for engaging one of the screw threaded fastening means 29. Therefore, the screw threaded stop means 31 may be adjusted for the desired position of the cutting edges 24 and 25 and the cutter 21 is then secured in place with the adjusting means 31 abutting the screw threaded fastening means 29 which serves to retain the cutter in this position until the adjusting means 31 is adjusted to a different position.

As best shown in FIGS. 1 to 3, a housing 32 is attached to the frame 10 and surrounds the periphery of the rotatable cutting head 12. The housing 32 is provided with a chip discharge opening 33 for a purpose to be later described. Provided on the periphery of the rotating head 12 are a plurality of radially extending vanes 34 which are disposed within the housing 32 and such vanes 34, together with the housing 32 serve to provide a centrifugal blower, the discharge of which is through the discharge opening 33. In order to provide for additional air flow through the housing 32, there may be provided auxiliary air intake openings 35 in one end of the housing 32 and auxiliary radial vanes 36 may be provided on the outer edges of the vanes 34 adjacent the auxiliary air intake openings 35. As shown in FIG. 6, the vanes 34 may be secured to the head 12 by screw threaded fastening means 37 or in any other suitable manner.

With particular reference to FIG. 1, there is shown log centering and guiding means 38 disposed adjacent the infeed end of the head 12 and in order to facilitate entry of the end of a log into the head 12 there may also be provided a ring 39 on the large end of the head 12, the ring 39 having a tapered log engaging surface 40.

Since the apparatus of FIG. 1 is intended to be utilized for reducing a log to a cylindrical bolt, as well as for producing chips, there is provided on the out-feed side of the apparatus means for engaging and supporting the cylindrical bolt as the same moves out of the apparatus and as best shown in FIGS. 1 and 2, this bolt engaging and supporting means may well comprises a series of bolt engaging rolls 41 mounted on radially extending arms 42 which in turn are pivotally supported on pins 43 carried by the frame 10. The rolls 41 may be urged inwardly into engagement with the bolt by means of torsion rubber bushings 44 or other suitable means which serves to bias the arms 42 and the rolls 41 inwardly.

As shown in FIGS. 1 and 3, the apertures 20 in the head 12 and the cutters 21 are disposed in a single spiral helical path, but if desired, and in order to increase the rate of chip production, the aperture 20 and cutters 21 may be disposed in a plurality of spiral helical paths and for purposes of illustration, there is shown in FIG. 12, an arrangement in which the cutters are provided in two spiral helical paths, but it is to be understood that additional rows of cutters may be provided in order to increase production, such arrangements being limited only by space requirements and power requirements.

As shown in FIG. 1, a log 45 is fed longitudinally of the length thereof through the supporting and guiding means 38 into the interior of the head 12 and upon rotation of such head the cutters 21 serve to remove material from the log 45 in the form of chips and to reduce the log 45 to a cylindrical bolt as shown in dotted lines at 46, which bolt emerges from the head 12 through the cylindrical portion 19 and is engaged and supported by the guide rolls 41. The specific manner of operation of the cutters 21, together with the character of chips produced thereby will be later described, but it is to be noted that the cutting edges on the cutters 21 project inwardly of the cylindrical surface 19 a distance sufficient to provide a cylindrical bolt 46 of the desired diameter and the cutter 21 disposed along the conical surface 18 of the head 12 projects inwardly the same distance as the cutters projecting inwardly of the cylindrical surface 19. In this manner, each cutter, regardless of the location thereof, serves to provide a chip of the same thickness. However, as stated, a more detailed description of the cutting operation will be later described.

The chips produced by the cutting operation are projected radially outwardly through the apertures 20 in the head 12 by centrifugal force and such chips are discharged into the housing 32 and in turn are discharged therefrom through the opening 33 by the centrifugal blower provided by the vanes 34 on the periphery of the head 12. Thus, centrifugal force serves to clear chips from the cutters 21 thereby facilitating the cutting operation and furthermore, no additional power is required to discharge the chip from the head 12, as is the case in prior art apparatus where the chips are discharged in a direction opposite to that of the centrifugal force.

With particular reference to FIGS. 13 and 14, there is shown a modified form of the invention in which an apparatus is provided for reducing an entire log to usable chips of substantially uniform width and thickness and this apparatus may well comprise a base 47 having a frame 48 supported thereby and the frame 48 serves to rotatably mount a hollow shaft 49 which is provided with a pulley 50 engaged by a belt 51 which in turn engages a pulley 52 mounted on the drive shaft of a suitable drive motor 53 carried by the frame 48.

A hollow conical cutting head 54 is secured at the small end thereof by screw threaded fastening means 55 or the like to the hollow shaft 49 and the head 54 is provided with a plurality of radial apertures 56 extending therethrough and arranged in a spiral helical path in the same manner as described above in connection with the first form of the invention.

Secured in the apertures 56 in the head 54 are cutters 21 of the same form as described above and it is to be noted that the shearing edges 24 of the cutters 21 are disposed parallel to the axis of the head 54 while the parting edges 25 of the cutters 21 are disposed at an angle to the shearing edges 24 in the same manner as described above.

A housing 57 surrounds the periphery of the head 54 and the housing 57 is provided with a discharge opening 58 from which chips are discharged by means of a centrifugal blower provided by radial vanes 59 secured to the periphery of the head 54 within the housing 57 to provide a centrifugal blower in the same manner as described above.

The hollow shaft 49 is mounted in suitable bearings 60 carried by the frame 48 and mounted within the hollow shaft 49 are bearings 61 which serve to mount a stub shaft 62 for free rotation within the hollow shaft 49. The stub shaft 62 projects into the interior of the head 54 and mounted on this projecting end of the stub shaft 62 is cylindrical log supporting and guiding means 63 which may also be supported by suitable brace means 64 attached to the frame 48. The log supporting and guiding means 63 is provided with a log engaging surface 65 which is disposed in close proximity to the cutting edges of the cutter 21 at the small diameter end of the head 54 and additional log guiding means in the form of rolls 66 or other suitable means may also be provided and the manner of operation thereof will be presently described.

As shown in FIG. 13, any suitable log feeding means 67 may be provided for engaging and feeding a log 68 longitudinally of the length thereof into the interior of the head 54 and as clearly shown in FIGS. 13 and 14, the log 68 passes between the rolls 66 and into engagement with the surface 55 of the log supporting and guiding means 63 which serves to support the log 68 in an off-center position and with the entire leading end of the log 68 in engagement with the cutters 21 in the head 54. Rotation of the head 54 will serve to cut helical chips from the log 68 in the same manner as described above and, since the supporting surface 65 of the log supporting and guiding means 63 is disposed in close proximity to the cutter 21 at the small end of the head 54, the entire log will be reduced to chips. The chips resulting from the cutting operation are discharged radially outwardly through the apertures 56 in the head 54 by means of centrifugal force and such chips are discharged from the housing 57 through the discharge opening 58 by the centrifugal blower provided by the vanes 59. The rolls or other guiding means 66 serve to prevent movement of the log 68 about the axis of the head 54 during the cutting operation.

While the apparatus shown in FIGS. 13 and 14 for ease of illustration is shown as operating on a single log, it will be understood that, if desired, suitable means may be provided for feeding a plurality of logs longitudinally of the length thereof into the interior of the head 54, in which case suitable additional rolls 66 will be provided and the cutters 21 will operate simultaneously on all of the logs to reduce the same to chips.

A slight variation of the form of the invention shown in FIGS. 13 and 14 and described above is illustrated in FIGS. 15 and 16, in which the apparatus comprises a frame 69 having bearings 70 therein for rotatably mounting a hollow shaft 71 in a vertical position. A pulley 72 is fixed to the hollow shaft 71 and a belt 73 engages the pulley 72 and a pulley 74 fixed to the drive shaft of a suitable drive motor 75 also mounted on the frame 69.

A hollow conical cutting head 76 is secured at the small end thereof by screws threaded or other suitable fastening means 77 to the hollow shaft 71 and the head 76 is provided with a plurality of radial apertures 78 extending therethrough, which apertures are disposed in a spiral helical path. Secured in the apertures 78 are cutters 21 of the same type as described above and with the cutting edges arranged in the same manner as described in connection with the form of the invention shown in FIGS. 13 and 14.

A stub shaft 79 extends into the hollow shaft 71 and is mounted in bearings 80 therein for free rotation with respect to the hollow shaft 71. Mounted on the stub shaft 79 and projecting upwardly axially of the head 76 is a log guiding and supporting means in the form of a cylindrical member 180 and attached to the frame 69 are a plurality of radially extending additional log engaging and supporting means 81 which, as clearly shown in FIG. 16, provide a plurality of sector shaped opening 82 through which a plurality of logs 83 may be fed downwardly longitudinally of the length of the logs into the interior of the head 76 such logs being supported by the log engaging and supporting means 180, as well as by the additional log supporting means 81, the latter of which serves to prevent movement of the logs about the axis of the head 76.

The surface of the log engaging and supporting means 180 is disposed in close proximity to the cutter at the small end of the head 76 and consequently, the leading ends of the logs 83 will be engaged by the cutters 21 and each log will be reduced to chips with the cutters 21 simultaneously operating on all of the logs.

The chips produced by the cutting operation are discharged outwardly of the head 76 through the apertures 78 by centrifugal force and in order to conveniently collect and deliver such chips to a desired point of use, the periphery of the head 76 may be surrounded by a housing 84 which is provided at a lower end thereof with a discharge opening 85 and the housing 84 may be provided with an inclined lower wall 86 for the purpose of directing chips downwardly to the discharge opening 85 from which the chips may flow by gravity.

With particular reference to FIGS. 17 and 18, there is shown a still further modified form of the apparatus of this invention and which comprises a frame 87 in which are mounted bearings 88 which serve to rotatably support a hollow shaft 89 in a horizontal position. Fixed to the hollow shaft 89 is a pulley 90 engaging a belt 91 which in turn engages a pulley 92 fixed to the drive shaft of a suitable motor 93 mounted on the frame 87.

A hollow cylindrical drum 94 having a closed end 95 is fixed to the hollow shaft 89 by screw threaded or other suitable fastening means 96 and the drum 94 is provided with a plurality of substantially radial apertures 97 extending therethrough, which apertures are disposed in a helical path. Secured in the apertures 97 are cutters 21 of the same type as those described above, but in this form of the invention, the shaving edges 24 are disposed at an angle to the axis of the drum 94 with the parting edges 25 disposed at an angle to the shaving edges 24, as in the previous forms of the invention.

Bearings 98 disposed in the hollow shaft 89 serve to mount a stub shaft 99 for free rotation with respect to the hollow shaft 89 and a bracket 100 carried by the stub shaft 99 serves to support a log engaging and guiding trough 101 disposed within the drum 94 and the trough may, if desired, be additionally supported by a bracket 102 extending upwardly from the frame 87. As clearly shown in FIG. 17, the log engaging and supporting trough 101 is disposed at the same angle to the axis of the drum 94 as the shaving edges 24 of the cutters 21, or in other words, the trough 101 is disposed parallel to the shaving edges 24.

In the form of the invention shown in FIGS. 17 and 18, a log 103 is fed longitudinally of the length thereof through the trough 101 to bring the leading end of the log into engagement with the cutters 21 within the drum 94 with the result that the entire log 103 will be reduced to chips with the cutters operating in the same manner as in the previously described forms of the invention to produce helical chips which are discharged through the apertures 97 in the drum 94 by centrifugal force and in order to collect and discharge such chips to a desired place of use, the drum shaped cutting head 94 is surrounded by a housing 104 provided with a discharge opening 105 and radial vanes 106 are provided on the periphery of the head 94 within the housing 104 to provide a centrifugal blower which will serve to discharge chips from the housing 104 through the discharge opening 105.

Since the log 103 is disposed at an angle to the axis of the head 104, a log of materially greater diameter can be accommodated in this form of the apparatus for a given diameter of the head 94 than is possible in the other forms of the invention where the log is fed axially of the cutting head and, therefore, the form of the invention shown in FIGS. 17 and 18 is particularly well adapted for portable use.

While the forms of the invention shown in FIGS. 13 to 18 have been described as provided with cutters arranged in a single spiral helical path in the forms of FIGS. 13 to 16 and in a single helical path in the form of FIGS 17 and 18, it is to be understood that such cutters may be arranged in a plurality of spiral helical paths or a plurality of helical paths as described in connection with FIG. 12, in which case a plurality of cutters will be simultaneously operating at each diameter, rather than a single cutter as is the case when a single spiral helical row or a single helical row of cutters is utilized. In this manner, the speed of chip production may be materially increased, but, of course, this will result in an increase in power consumption.

With particular reference to FIGS. 19 to 21, there is shown more or less diagrammatically, the manner in which the method of this invention is carried out, as well as the manner of operation of the apparatus in order to produce a chip of the type shown in FIG. 22 and having a cross section generally in the form of a parallelogram as shown in FIG. 23. As shown in FIG. 19, a log 107 is fed in the direction of the arrow into the rotating cutting head of the apparatus and the shaving edges of the cutters 24 cut along the lines 108 in a direction generally parallel to the length of the fibers in the log 107 and the parting edges 25 cut along the lines 109 at an angle to the length of the fibers in the log 107 to remove a series of helical chips 110, 111 and 112 therefrom. The number of chips corresponding to the number of cutters 21 in engagement with the log 107. In the example shown in FIG. 19, the cutters 21 are spaced axially of the cutter head a distance substantially equal to one-half the width of the cutter and, therefore, the chips 110, 111 and 112 will overlap a distance approximately equal to one-half the width of each cutter 21.

A further example is shown in FIG. 20 in which the cutters 21 are spaced axially of the cutter head the minimum distance possible while still producing a chip having a cross section generally in the form of a parallelogram. Once again, in FIG. 20, a log 113 is fed longitudinally of the length thereof in the direction of the arrow into the cutting head of the apparatus and the cutting tools 21 engage the log with the shaving edges 24 cutting along the lines 114, 115 and 116 and the parting edges 25 cutting along the lines 117 and 118. As before, the shaving edges 24 provide a cut generally parallel to the length of the fibers in the log 113 and the parting edges 25 cut across the fibers at an angle thereto. With the cutters spaced to provide a cutting action as shown in FIG. 20, the parting edges 25 cut along the lines 117 and 118 which are substantially straight from the inner cutter to the outer cutter, rather than stepped as in the example shown in FIG. 19. Similarly to FIG. 19, however, the number of chips 119, 120 and 121 correspond with the number of cutters 21 in cutting engagement with the log 113.

With particular reference to FIG. 21, there is shown in perspective a log 122 being operated upon by a series of cutters 21 arranged in the same manner as descirbed above in connection with FIG. 20 and FIG. 21 also shows the manner in which the log 122 is reduced to a cylindrical bolt 123 while the material removed from the log 122 to provide the cylindrical bolt 123 is in the form of usable chips of substantially uniform width and thickness. The cutters 21 which are mounted in the cutter head of the apparatus are arranged in such a manner that the shaving edges 24 engage the log 122 at progressively increasing distances 124, 125, 126, 127 and 128 from the desired outer diameter of the cylindrical bolt 123. The parting edges 25 cut along lines 129 and 130 and as a result, a seires of helical chips corresponding to the number of cutters in cutting engagement with the log 122 are removed therefrom, it being clear from FIG. 21 that each cutter operates at a different diameter.

While in the examples shown in FIGS. 19 to 21, only a single series of cutters arranged in a spiral helical path are utilized, it will be obvious that where the cutters are arranged in a plurality of spiral helical paths that a plurality of such cutters will be operating at each different diameter in order to simultaneously remove helical chips at each diameter thereby materially increasing the rate of chip production.

With particular reference to FIGS. 22 and 23, there is shown a chip produced and by operating the apparatus described above and as shown in FIG. 22, the chip 131 is in the form of a section of a helicoidal spiral which is defined between radially spaced substantially concentric inner and outer parallel surfaces 132 and 133 respectively and these surfaces 132 and 133 are substantially surfaces of revolution about a common axis. As clearly shown in FIGS. 22 and 23, the surfaces 132 and 133 which are provided by the shaving edges 24 of the cutters 21 are substantially parallel to the length of the fibers in the wood and the parallel conical end surfaces 134 and 135 provided by the parting edges 25 of the cutters 21 extend across the fibers of the wood at an angle thereto and thereby provide a chip 131 having a cross section substantially in the form of a parallelogram. The fibers in the chip 131 are substantially free throughout their length from lateral distortion and displacement relative to each other due to the fact that the shaving edges 24 of the cutters 21 sever the chips from the log along lines substantially parallel to the length of the fibers and since the parting edges 25 are relatively short and further, since they cut at an angle to the length of the fibers there is little, if any, distortion or displacement of such fibers along the edges 134 and 135 of the chips which are cut by the parting edges 25.

As a result, the chips 131 produced by the apparatus of this invention is of substantially uniform width and thickness and is of uniform high quality, by reason of the fact that there is no distortion or displacement of the fibers relative to each other and such chips may be utilized to produce wood pulp having superior characteristics.

In order to ensure the production of chips of substantially uniform width and thickness and also, in order to produce chips at the desired rate, it is essential that the log be fed into the apparatus at a constant predetermined rate which is related to the speed of rotation of the cutting head and by reason of this relationship of feed and speed of rotation of the cutting head, the cutters operate much in the nature of thread cutters, the chips removed by the apparatus of this invention being analogous to the threads cut in a cylindrical member by a thread cutting apparatus, except, of course, the chips are removed at different diameters while in thread cutting, the same normally takes place on a single diameter.

While as shown and described above, a plurality of apertures disposed in a spiral helical path or in a helical path have been provided in the head for receiving cutters secured to the head, it will be understood that if desired other cutter arrangements may be utilized such as a plurality of cutters each having a plurality of cutting components disposed in the desired path, in which case there would not be an aperture in the head for each cutting component, but suitable openings would be provided in the head, each opening permitting the discharge of chips from a plurality of cutting components.

It is also to be noted that while the apparatus described above includes a rotatable cutting head and driving means for the head, if desired the head may remain fixed and suitable log feeding and rotating means may be provided to cause relative rotation between the log and the head to produce chips in the same manner as described above.

While normally the width of the shaving edge will be substantially equal to the width of the chip, if desired a cutter may be utilized having a shaving edge of less width than the width of the chip, in which case the cutter operates to provide a parting cut together with a shaving cut less than the width of the chip with the remainder of the chip being split from the log along the length of the fibers by the action of the shaving edge.

It will be obvious that by the above described invention there has been provided an apparatus for reducing a log to a cylindrical bolt while removing usable chips therefrom or for reducing an entire log to chips and as a result, there has also been provided as a new article of manufacture a chip of high quality which may be utilized to produce pulp having superior characteristics. The apparatus of this invention is relatively simple in construction and may be operated at a relatively high production rate and furthermore, in one form thereof, the physical size of the apparatus necessary to accommodate logs of relatively large diameter has been materially reduced thereby adapting the apparatus for portable use.

It will be obvious to those skilled in the art that various changes may be made in the invention without departing from the spirit and scope thereof, and therefore the invention is not limited by that which is shown in the drawings and described in the specification, but only as indicated in the appended claims.

What is claimed is:

1. An apparatus for reducing a log to a cylindrical bolt and for producing usable chips of substantially uniform width and thickness, said apparatus comprising a frame, a hollow frusto-conical head open at both ends rotatably mounted in said frame, means to drive said head, said head having a conical inner surface merging into a cylindrical inner surface adjacent the end of smaller diameter, said head having a plurality of circumferentially elongated radial apertures extending therethrough, said apertures being disposed in a spiral helical path extending from said cylindrical surface to a point adjacent the large end of said head, an elongated cutter secured in each aperture, cutting edges on the inner end of each cutter, certain of said cutting edges being disposed inwardly of said cylindrical surface a predetermined distance and the remainder of said cutting edges being disposed the same distance inwardly of said conical surface, said cutting edges comprising a shaving edge disposed substantially parallel to the axis of rotation of said head and a parting edge disposed at an angle to said shaving edge, whereby upon feeding a log longitudinally through said head and rotation of said head, said cutter will operate to remove wood from said log in the form of helical chips of substantially uniform width and thickness and to provide a cylindrical bolt of a diameter determined by the location of the innermost shaving edge, said shaving edges cutting substantially parallel to the fibers in said log and said parting edges cutting across the fibers at an angle thereto, said chips being discharged radially outwardly through said apertures by centrifugal force.

2. An apparatus as defined in claim 1, in which said frame includes a housing surrounding the periphery of said head, said housing having a chip discharge opening, and circumferentially spaced radial vanes on the outer surface of said head within said housing to provide a centrifugal blower, chips discharged from said head through said apertures being discharged from said housing through said opening by said blower.

3. An apparatus as defined in claim 2, in which said housing is provided with auxiliary air intake openings in one end wall thereof, and auxiliary vanes on the outer edges of said first vanes adjacent said intake openings to provide additional air flow through said housing.

4. An apparatus as defined in claim 1, in which means is provided for centering and guiding said log entering said head, and additional means is provided for centering and guiding said bolts leaving said head.

5. An apparatus as defined in claim 1, in which said cutters are disposed in a single spiral helical path with each cutter operating at a different diameter.

6. An apparatus as defined in claim 1, in which said cutters are disposed in a plurality of concentric spiral helical paths, there being a plurality of cutters simultaneously operating at each different diameter.

7. An apparatus as defined in claim 1, in which a chip breaker is provided for each cutter and in which the radial positon of each cutter is adjustable.

8. An apparatus for reducing a log to a cylindrical bolt and for producing usable chips of substantially uniform width and thickness, said apparatus comprising a frame, a hollow frusto-conical head open at both ends rotatably mounted in said frame, means to drive said head, said head having a conical inner surface merging into a cylindrical surface adjacent the end of smaller diameter, said head having a plurality of substantially radial apertures extending therethrough, said apertures being disposed in a spiral helical path extending from said cylindrical surface to a point adjacent the large end of said head, an elongated cutter secured in each aperture, cutting edges on the inner end of each cutter, certain of said cutting edges being disposed inwardly of said cylindrical surface at a predetermined distance and the remainder of said cutting edges being disposed the same distance inwardly of said conical surface, said cutting edges comprising a shaving edge disposed substantially parallel to the axis of rotation of said head and a parting edge disposed at an angle to said shaving edge, whereby upon feeding a log longitudinally through said head and rotation of said head, said cutters will operate to remove wood from said log in the form of helical chips of substantially uniform width and thickness and to provide a cylindrical bolt of a diameter determined by the location of the innermost shaving edge, said shaving edges cutting substantially parallel to the fibers in said log and said parting edges cutting across the fibers at an angle thereto, said chips being discharged radially outwardly through said apertures by centrifugal force.

9. An apparatus for reducing a log to a cylindrical bolt and for producing usable chips of substantially uniform width and thickness, said apparatus comprising a frame, a hollow frusto-conical head open at both ends rotatably mounted in said frame, means to drive said head, said head having a conical inner surface merging into a cylindrical inner surface adjacent the end of smaller diameter, said head having a plurality of substantially radial apertures extending therethrough, said apertures being disposed in a spiral helical path extending from said cylindrical surface to a point adjacent the large end of said head, a cutter secured in each aperture, cutting edges on the inner end of each cutter, certain of said cutting edges being disposed inwardly of said cylindrical surface a predetermined distance and the remainder of said cutting edges being disposed the same distance inwardly of said conical surface, said cutting edges comprising a shaving edge disposed substantially parallel to the axis of rotation of said head and a parting edge disposed at an angle to said shaving edge, whereby upon feeding a log longitudinally through said head and rotation of said head, said cutter will operate to remove wood from said log in the form of helical chips of substantially uniform width and thickness and to provide a cylindrical bolt of a diameter determined by the location of the innermost shaving edge, said shaving edges cutting substantially parallel to the fibers in said log and said parting edges cutting across the fibers at an angle thereto, said chips being discharged radially outwardly radially through said apertures by centrifugal force.

10. An apparatus for reducing a log to a cylindrical bolt and for producing usable chips of substantially uniform width and thickness, said apparatus comprising a frame, a hollow frusto-conical head open at both ends rotatably mounted in said frame, means to drive said head, said head having a conical inner surface merging into a cylindrical inner surface adjacent the end of smaller diameter, said head having a plurality of substantially radial apertures extending therethrough, said apertures being disposed in a spiral helical path extending from said cylindrical surface to a point adjacent the large end of said head, a cutter secured to said head adjacent each aperture, cutting edges on the inner end of each cutter, certain of said cutting edges being disposed inwardly of said cylindrical surface a predetermined distance and the remainder of said cutting edges being disposed the same distance inwardly of said conical surface, said cutting edges comprising a shaving edge disposed substantially parallel to the axis of rotation of said head and parting edge disposed at an angle to said shaving edge, whereby upon feeding a log longitudinally through said head and rotation of said head, said cutters will operate to remove wood from said log in the form of helical chips of substantially uniform width and thickness and to provide a cylindrical bolt of a diameter determined by the location of the innermost shaving edge, said shaving edges cutting substantially parallel to the fibers in said log and said parting edges cutting across the fibers at an angle thereto, said chips being discharged radially outwardly through said apertures by centrifugal force.

11. An apparatus for reducing an entire log to usable chips of substantially uniform width and thickness, said apparatus comprising a frame, a hollow frusto-conical head mounted in said frame, means to drive said head, said head having a conical inner surface, said head having a plurality of circumferentially elongated substantially radial apertures extending therethrough, said apertures being disposed in a spiral helical path, an elongated cutter secured in each aperture, cutting edges on the inner end of each cutter, said cutting edges being disposed at substantially equal distances inwardly from said conical surface, said cutting edges comprising a shaving edge disposed substantially parallel to the axis of rotation of said head and a parting edge disposed at an angle to said shaving edge, log supporting and guiding means disposed centrally within said head and extending axially thereof, said last named means having a log engaging surface disposed in close proximity to the cutting edges of the cutter at the small diameter end of said head to support and guide a log within said head and offset from the axis of rotation of said head and additional log guiding means for preventing movement of said log around the axis of said head, whereby upon feeding a log longitudinally into said head in engagement with said log supporting and guiding means and said additional log guiding means and rotation of said head, said cutters will engage and remove wood from the entire leading end of said log in the form of helical chips of substantially uniform width and thickness, said shaving edges cutting substantially parallel to the fibers in said log and said parting edges cutting across the fibers at an angle thereto, continued feeding of said log resulting in reducing the entire log to chips and said chips being discharged radially outwardly through said apertures by centrifugal force.

12. An apparatus as defined in claim 11, in which a plurality of said additional log guiding means are disposed in circumferentially spaced relationship around said log supporting and guiding means, whereby a plurality of logs may be fed simultaneously into said head and simultaneously reduced to chips.

13. An apparatus as defined in claim 11, in which said frame includes a housing surrounding the periphery of said head, said housing having a chip discharge opening, and circumferentially spaced radial vanes on the outer surface of said head within said housing to provide a centrifugal blower, chips discharged from said head through said apertures being discharged from said housing through said opening by said blower.

14. An apparatus as defined in claim 11, in which said cutters are disposed in a single spiral helical path with each cutter operating at a different diameter.

15. An apparatus as defined in claim 11, in which said cutters are disposed in a plurality of concentric spiral helical paths, there being a plurality of cutters simultaneously operating at each different diameter.

16. An apparatus as defined in claim 11, in which a chip breaker is provided for each cutter and in which the radial position of each cutter is adjustable.

17. An apparatus as defined in claim 11, in which said head is fixed to a hollow shaft rotatably mounted in said frame, said shaft terminating at the small end of said head, said log supporting and guiding means comprising an elongated cylindrical member disposed within said head in alignment with the axis thereof, a stub shaft fixed to the inner end of said last named cylindrical member and extending into said hollow shaft and bearings mounting said stub shaft in said hollow shaft for free rotation.

18. An apparatus for reducing an entire log to usable chips of substantially uniform width and thickness, said apparatus comprising a frame, a hollow frusto-conical head rotatably mounted in said frame, means to drive said head, said head having a conical inner surface, said head having a plurality of substantially radial apertures extending therethrough, said apertures being disposed in a spiral helical path, an elongated cutter secured in each aperture, cutting edges on the inner end of each cutter, said cutting edges being disposed at substantially equal distances inwardly from said conical surface, said cutting edges comprising a shaving edge disposed substantially parallel to the axis of rotation of said head and a parting edge disposed at an angle to said shaving edge, log supporting and guiding means disposed centrally within said head and extending axially thereof, said last named means having a log engaging surface disposed in close proximity to the cutting edges of the cutter at the small diameter end of said head to support and guide a log within said head and offset from the axis of rotation of said head and additional log guiding means for preventing movement of said log around the axis of said head, whereby upon feeding a log longitudinally into said head in engagement with said log supporting and guiding means and said additional log guiding means and rotation of said head said cutters will engage and remove wood from the entire leading end of said log in the form of helical chips of substantially uniform width and thickness, said shaving edges cutting substantially parallel to the fibers in said log and said parting edges cutting across the fibers at an angle thereto, continued feeding of said log resulting in reducing the entire log to chips and said chips being discharged radially outwardly through said apertures by centrifugal force.

19. An apparatus for reducing an entire log to usable chips of substantially uniform width and thickness, said apparatus comprising a frame, a hollow frusto-conical head rotatably mounted in said frame, means to drive said head, said head having a conical inner surfce, said head having a plurality of substantially radial apertures extending therethrough, said apertures being disposed in a spiral helical path, a cutter secured in each aperture, cutting edges on the inner end of each cutter, said cutting edges being disposed at substantially equal distances inwardly from said conical surface, said cutting edges comprising a shaving edge disposed substantially parallel to the axis of rotation of said head and a parting edge disposed at an angle to said shaving edge, log supporting and guiding means disposed centrally within said head and extending axially thereof, said last named means having a log engaging surface disposed in close proximity to the cutting edges of the cutter at the small diameter end of said head to support and guide a log within said head and offset from the axis of rotation of said head and additional log guiding means for preventing movement of said log around the axis of said head, whereby upon feeding a log longitudinally into said head in engagement with said log supporting and guiding means and said additional log guiding means and rotation of said head, said cutter will engage and remove wood from the entire leading end of said log in the form of helical chips of substantially uniform width and thickness, said shaving edges cutting substantially parallel to the fibers in said log and said parting edges cutting across the fibers at an angle thereto, continued feeding of said log resulting in reducing the entire log to chips and said chips being discharged radially outwardly through said apertures by centrifugal force.

20. Apparatus for reducing an entire log to usable chips of substantially uniform width and thickness, said apparatus comprising a frame, a hollow frusto-conical head rotatably mounted in said frame, means to drive said head, said head having a conical inner surface, said head having a plurality of substantially radial apertures extending therethrough, said apertures being disposed in a spiral helical path, a cutter secured in each aperture, cutting edges on the inner end of each cutter, said cutting edges being disposed at substantially equal distances inwardly from said conical surface, said cutting edges, comprising a shaving edge disposed substantially parallel to the axis of rotation of said head and a parting edge disposed at an angle to said shaving edge, log supporting and guiding means disposed centrally within said head and extending axially thereof, said last named means having a log engaging surface disposed in close proximity to the cutting edges of the cutter at the small diameter end of said head to support and guide a log within said head and offset from the axis of rotation of said head, whereby upon feeding a log longitudinally into said head in engagement with said log supporting and guiding means and rotation of said head, said cutters will engage and remove wood from the entire leading end of said log in the form of helical chips of substantially uniform width and thickness, said shaving edges cutting substantially parallel to the fibers in said log and said parting edges cutting across the fibers at an angle thereto, continued feeding of said log resulting in reducing the entire log to chips and said chips being discharged radially outwardly through said apertures by centrifugal force.

21. An apparatus for reducing an entire log to usable chips of substantially uniform width and thickness, said apparatus comprising a frame, a hollow frusto-conical head rotatably mounted in said frame, means to drive said head, said head having a conical inner surface, said head having a plurality of substantially radial apertures extending therethrough, said apertures being disposed in a spiral helical path, a cutter secured in each aperture, cutting edges on the inner end of each cutter, said cutting edges being disposed at substantially equal distances inwardly from said conical surface, said cutting edges comprising a shaving edge disposed substantially parallel to the axis of rotation of said head and a parting edge disposed at an angle to said shaving edge, log supporting and guiding means having a log engaging surface disposed in close proximity to the cutting edges of the cutter at the small diameter end of said head to support and guide a log within said head and offset from the axis of rotation of said head, whereby upon feeding a log longitudinally into said head in engagement with said log supporting and guiding means and rotation of said head, said cutters will engage and remove wood from the entire leading end of said log in the form of helical chips of substantially uniform width and thickness, said shaving edges cutting substantially parallel to the fibers in said log and said parting edges cutting across the fibers at an angle thereto, continued feeding of said log resulting in reducing the entire log to chips and said chips being discharged radially outwardly through said apertures by centrifugal force.

22. An apparatus for reducing an entire log to usable chips of substantially uniform width and thickness, said apparatus comprising a frame, a hollow frusto-conical head rotatably mounted in said frame, means to drive said head, said head having a conical inner surface, said head having a plurality of substantially radial apertures extending therethrough, said apertures being disposed in a spiral helical path, a cutter secured to said head adjacent each aperture, cutting edges on the inner end of each cutter, said cutting edges being disposed at substantially equal distances inwardly from said conical surface, said cutting edges comprising a shaving edge disposed substantially parallel to the axis of rotation of said head and a parting edge disposed at an angle to said shaving edge, log supporting and guiding means having a log engaging surface disposed in close proximity to the cutting edges of the cutter at the small diameter end of said head to support and guide a log within said head and offset from the axis of rotation of said head, whereby upon feeding a log longitudinally into said head in engagement with said log supporting and guiding means and rotation of said head, said cutters will engage and remove wood from the entire leading end of said log in the form of helical chips of substantially uniform width and thickness, said shaving edges cutting substantially parallel to the fibers in said log and said parting edges cutting across the fibers at an angle thereto, continued feeding of said log resulting in reducing the entire log to chips and said chips being discharged radially outwardly through said apertures by centrifugal force.

23. An apparatus as defined in claim 11, in which said head is mounted for rotation about a vertical axis with the large end of said head uppermost, said log being fed longitudinally downwardly into said head.

24. An apparatus as defined in claim 23, in which a plurality of said additional log guiding means are disposed in circumferentially spaced relationship around said log supporting and guiding means, whereby a plurality of logs may be simultaneously fed longitudinally downwardly into said head and simultaneously reduced to chips.

25. An apparatus as defined in claim 23, in which said frame includes a vertical housing surrounding the periphery of said head and said housing having a chip discharge opening at the lower end, whereby chips discharged from said head through said apertures are discharged from said housing by gravity through said opening.

26. An apparatus as defined in claim 23, in which said cutters are disposed in a single spiral helical path with each cutter operating at a different diameter.

27. An apparatus as defined in claim 23, in which said cutters are disposed in a plurality of concentric spiral helical paths, there being a plurality of cutters simultaneously operating at each different diameter.

28. An apparatus as defined in claim 23, in which a chip breaker is provided for each cutter and in which the radial position of each cutter is adjustable.

29. An apparatus as defined in claim 23, in which said head is fixed to a vertical hollow shaft rotatably mounted in said frame, said shaft terminating at the lower small end of said head, said log supporting and guiding means comprising an elongated cylindrical member disposed within said head in alignment with the axis thereof, a stub shaft fixed to the inner end of said last named cylindrical member and extending into said hollow shaft and bearings mounting said stub shaft in said hollow shaft for free rotation.

30. An apparatus for reducing an entire log to usable chips of substantially uniform width and thickness, said apparatus comprising a frame, a hollow cylindrical head having a closed end and an open end rotatably mounted in said frame, means to drive said head, said head having a cylindrical inner surface, said head having a plurality of circumferentially elongated substantially radial apertures extending therethrough, said apertures being disposed in a helical path, an elongated cutter secured in each aperture, cutting edges on the inner end of each cutter, said cutting edges being disposed at substantially equal distances inwardly from said cylindrical surface, said cutting edges comprising a shaving edge disposed at an angle to the axis of rotation of said head and a parting edge disposed at an angle to said shaving edge, and log supporting and guiding means disposed within said head, said log supporting and guiding means comprising log engaging means disposed at an angle to the axis of rotation of said head, the angular disposition of said log engaging means being substantially equal to the angular disposition of said shaving edges, whereby upon feeding a log longitudinally into said head in engagement with said log supporting and guiding means and rotation of said head, said log will be disposed at an angle to said cylindrical surface and said cutters will engage and remove wood from the entire leading end of said log in the form of helical chips of substantially uniform width and thickness, said shaving edges cutting substantially parallel to the fibers in said log and said parting edges cutting across the fibers at an angle thereto, continued feeding of said log resulting in reducing the entire log to chips and said chips being discharged radially outwardly through said apertures by centrifugal force.

31. An apparatus as defined in claim 30, in which said frame includes a housing surrounding the periphery of said head, said housing having a chip discharge opening, and circumferentially spaced radial vanes on the outer surface of said head within said housing to provide a centrifugal blower, chips discharged from said head through said apertures being discharged from said housing through said opening by said blower.

32. An apparatus as defined in claim 30, in which said cutters are disposed in a single helical path with each cutter operating at a different diameter of said log.

33. An apparatus as defined in claim 30, in which said cutters are disposed in a plurality of helical paths, there being a plurality of cutters simultaneously operating at each different diameter of said log.

34. An apparatus as defined in claim 30, in which a chip breaker is provided for each cutter and in which the radial position of each cutter is adjustable.

35. An apparatus as defined in claim 30, in which the closed end of said head is fixed to a hollow shaft rotatably mounted in said frame, said log supporting and guiding means having a stub shaft fixed thereto and extending into said hollow shaft and bearings mounting said stub shaft in said hollow shaft for free rotation.

36. An apparatus as defined in claim 30, in which said log supporting and guiding means comprises a trough for receiving and supporting the leading portion of said log.

37. An apparatus for reducing an entire log to usable chips of substantially uniform width and thickness, said apparatus comprising a frame, a hollow cylindrical head having a closed end and an open end rotatably mounted in said frame, means to drive said head, said head having a cylindrical inner surface, said head having a plurality of substantially radial apertures extending therethrough, said apertures being disposed in a helical path, an elongated cutter secured in each aperture, cutting edges on the inner end of each cutter, said cutting edges being disposed at substantially equal distances inwardly from said cylindrical surface, said cutting edges comprising a shaving edge disposed at an angle to the axis of rotation of said head and a parting edge disposed at an angle to said shaving edge, and log supporting and guiding means disposed within said head, said log supporting and guiding means comprising log engaging means disposed at an angle to the axis of rotation of said head, the angular disposition of said log engaging means being substantially equal to the angular disposition of said shaving edges, whereby upon feeding a log longitudinally into said head in engagement with said log supporting and guiding means and rotation of said head, said log will be disposed at an angle to said cylindrical surface and said cutters will engage and remove wood from the entire leading end of said log in the form of helical chips of substantially uniform width and thickness, said shaving edges cutting substantially parallel to the fibers in said log and said parting edges cutting across the fibers at an angle thereto, continued feeding of said log resulting in reducing the entire log to chips and said chips being discharged radially outwardly through said apertures by centrifugal force.

38. An apparatus for reducing an entire log to usable chips of substantially uniform width and thickness, said apparatus comprising a frame, a hollow cylindrical head having a closed end and an open end rotatably mounted in said frame, means to drive said head, said head having a cylindrical inner surface, said head having a plurality of substantially radial apertures extending therethrough, said apertures being disposed in a helical path, a cutter secured in each aperture, cutting edges on the inner end of each cutter, said cutting edges being disposed at substantially equal distances inwardly from said cylindrical surface, said cutting edges comprising a shaving edge disposed at an angle to the axis of rotation of said head and a parting edge disposed at an angle to said shaving edge, and log supporting and guiding means disposed within said head, said log supporting and guiding means comprising log engaging means disposed at an angle to the axis of rotation of said head, the angular disposition of said log engaging means being substantially equal to the angular disposition of said shaving edges, whereby upon feeding a log longitudinally into said head in engagement with said log supporting and guiding means and rotation of said head, said log will be disposed at an angle to said cylindrical surface and said cutters will engage and remove wood from the entire leading end of said log in the form of helical chips of substantially uniform width and thickness, said shaving edges cutting substantially parallel to the fibers in said log and said parting edges cutting across the fibers at an angle thereto, continued feeding of said log resulting in reducing the entire log to chips and said chips being discharged radially outwardly through said apertures by centrifugal force.

39. An apparatus for reducing an entire log to usable chips of substantially uniform width and thickness, said apparatus comprising a frame, a hollow cylindrical head rotatably mounted in said frame, means to drive said head, said head having a cylindrical inner surface, said head having a plurality of substantially radial apertures extending therethrough, said apertures being disposed in a helical path, a cutter secured in each aperture, cutting edges on the inner end of each cutter, said cutting edges being disposed at substantially equal distances inwardly from said cylindrical surface, said cutting edges comprising a shaving edge disposed at an angle to axis of rotation of said head and a parting edge disposed at an angle to said shaving edge, and log supporting and guiding means disposed within said head, said log supporting and guiding means comprising log engaging means disposed at an angle to the axis of rotation of said head, the angular disposition of said log engaging means being substantially equal to the angular disposition of said shaving edges, whereby upon feeding a log longitudinally into said head in engagement with said log supporting and guiding means and rotation of said head, said log will be disposed at an angle to said cylindrical surface and said cutters will engage and remove wood from the entire leading end of said log in the form of helical chips of substantially uniform width and thickness, said shaving edges cutting substantially parallel to the fibers in said log and said parting edges cutting across the fibers at an angle thereto, continued feeding of said log resulting in reducing the entire log to chips and said chips being discharged radially outwardly through said apertures by centrifugal force.

40. An apparatus for reducing an entire log to usable chips of substantially uniform width and thickness, said apparatus comprising a frame, a hollow cylindrical head rotatably mounted in said frame, means to drive said head, said head having a cylindrical inner surface, said head having a plurality of substantially radial apertures extending therethrough, said apertures being disposed in a helical path, a cutter secured in each aperture, cutting edges on the inner end of each cutter, said cutting edges being disposed at substantially equal distances inwardly from said cylindrical surfaces, said cutting edges comprising a shaving edge disposed at an angle to the axis of rotation of said head and a parting edge disposed at an angle to said shaving edge, and log supporting and guiding means comprising log engaging means disposed at an angle to the axis of rotation of said head, the angular disposition of said log engaging means being substantially equal to the angular disposition of said shaving edges, whereby upon feeding a log longitudinally into said head in engagement with said log supporting and guiding means and rotation of said head, said log will be disposed at an angle to said cylindrical surface and said cutters will engage and remove wood from the entire leading end of said log in the form of helical chips of substantially uniform width and thickness, said shaving edges cutting substantially parallel to the fibers in said log and said parting edges cutting across the fibers at an angle thereto continued feeding of said log resulting in reducing the entire log to chips and said chips being discharged radially outwardly through said apertures by centrifugal force.

41. An apparatus for reducing an entire log to usable chips of substantially uniform width and thickness, said apparatus comprising a frame, a hollow cylindrical head rotatably mounted in said frame, means to drive said head, said head having a cylindrical inner surface, said head having a plurality of substantially radial apertures extending therethrough, said apertures being disposed in a helical path, a cutter secured to said head adjacent each aperture, cutting edges on the inner end of each cutter, said cutting edges being disposed at substantially equal distances inwardly from said cylindrical surface, said cutting edges comprising a shaving edge disposed at an angle to the axis of rotation of said head and a parting edge disposed at an angle to said shaving edge, and log supporting and guiding means comprising log engaging means disposed at an angle to the axis of rotation of said head, the angular disposition of said log engaging means being substantially equal to the angular disposition of said shaving edges, whereby upon feeding a log longitudinally into said head in engagement with said log supporting and guiding means and rotation of said head, said log will be disposed at an angle to said cylindrical surface and said cutters will engage and remove wood from the entire leading end of said log in the form of helical chips of substantially uniform width and thickness, said shaving edges cutting substantially parallel to the fibers in said log and said parting edges cutting across the fibers at an angle thereto, continued feeding of said log resulting in reducing the entire log to chips and said chips being discharged radially outwardly through said apertures by centrifugal force.

42. An apparatus for cutting usable chips of substantially uniform width and thickness from a log, said apparatus comprising a frame, a hollow head rotatably mounted in said frame, means to drive said head, said head having a plurality of substantially radial apertures extending therethrough, said apertures being disposed in a helical path, an elongated cutter secured in each aperture, cutting edges on the inner end of each cutter, said cutting edges comprising a shaving edge and a parting edge disposed at an angle to said shaving edge, whereby upon feeding a log longitudinally into said head in a direction substantially parallel to said shaving edges and rotation of said head, said cutters will operate to remove wood from said log in the form of helical chips of substantially uniform width and thickness, said shaving edges cutting substantially parallel to the fibers in said log and said parting edges cutting across the fibers at an angle thereto, said chips being discharged radially outwardly through said apertures by centrifugal force.

43. An apparatus for cutting usable chips of substantially uniform width and thickness from a log, said apparatus comprising a frame, a hollow head rotatably mounted in said frame, means to drive said head, said head having a plurality of substantially radial apertures extending therethrough, said apertures being disposed in a helical path, a cutter secured in each aperture, cutting edges on the inner end of each cutter, said cutting edges comprising a shaving edge and a parting edge disposed at an angle to said shaving edge, whereby upon feeding a log longitudinally into said head in a direction substantially parallel to said shaving edges and rotation of said head, said cutters will operate to remove wood from said log in the form of helical chips of substantially uniform width and thickness, said shaving edges cutting substantially parallel to the fibers in said log and said parting edges cutting across the fibers at an angle thereto, said chips being discharged radially outwardly through said apertures by centrifugal force.

44. An apparatus for cutting usable chips of substantially uniform width and thickness from a log, said apparatus comprising a frame, a hollow head rotatably mounted in said frame, means to drive said head, said head having a plurality of substantially radial apertures extending therethrough, said apertures being disposed in a helical path, a cutter secured to said head adjacent each aperture, cutting edges on the inner end of each cutter, said cutting edges comprising a shaving edge and a parting edge disposed at an angle to said shaving edge, whereby upon feeding a log longitudinally into said head in a direction substantially parallel to said shaving edges and rotation of said head, said cutters will operate to remove wood from said log in the form of helical chips of substantially uniform width and thickness, said shaving edges cutting substantially parallel to the fibers in said log and said parting edges cutting across the fibers at an angle thereto, said chips being discharged radially outwardly through said apertures by centrifnugal force.

45. An apparatus for cutting usable chips from a log, said apparatus comprising a frame, a hollow head mounted in said frame, a plurality of cutting means including a plurality of cutting components secured to said head, each component comprising a shaving edge and a parting edge disposed at an angle to said shaving edge, said components being disposed in a helical path with said edges projecting inwardly of said head, said head having apertures extending therethrough adjacent said cutting means and means to provide relative rotation between said head and a log being fed longitudinally into said head in a direction substantially parallel to said shaving edges, whereby said cutting components will operate to remove wood from said log in the form of helical chips, said shaving edges cutting substantially parallel to the fibers in said log and said parting edges cutting across the fibers at an angle thereto, said chips being discharged radially outwardly through said apertures by centrifugal force.

46. Apparatus for reducing a pulpwood log to chip form, said apparatus comprising a hollow cutting head, cutter means mounted on said head, said cutter means including a plurality of cutting components, each component having a shaving edge and an angularly related parting edge extending from one end of said shaving edge, said head having a plurality of apertures and said cutter means being disposed in said apertures with the edges of said cutting components extending inwardly of the inner surface of said hollow head, means for effecting relative rotary movement between the log to be reduced and said head while feeding the log longitudinally of the length thereof into said head, said cutting components being fixed in said head to provide at least one series thereof positioned in a helical path with respect to the central longitudinal axis of said log with adjacent components of the series being at progressively greater distances from said axis and in axially overlapping relation with respect to a plane normal to said axis, the shaving edge of each of said components being positioned substantially parallel with said axis and the parting edges thereof extending outwardly therefrom at an angle providing an obtuse included angle between the edges of each component.

47. An apparatus as defined in claim 46, in which said frame includes a housing surrounding the periphery of said head, said housing having a chip discharge opening, and circumferentially spaced radial vanes on the outer surface of said head within said housing to provide a centrifugal blower, chips discharged from said head through said apertures being discharged from said housing through said opening by said blower.

48. An apparatus as defined in claim 47, in which said housing is provided with auxiliary air intake openings in one end wall thereof, and auxiliary vanes on the outer edges of said first vanes adjacent said intake openings to provide additional air flow through said housing.

49. An apparatus as defined in claim 46, in which said components are disposed in a single spiral helical path with each component operating at a different diameter of said log.

50. An apparatus as defined in claim 46, in which said components are disposed in a plurality of concentric spiral helical paths, there being a plurality of components operating at each different diameter of said log.

51. An apparatus as defined in claim 46, in which said components are disposed in a single helical path with each component operating at a different diameter of said log.

52. An apparatus as defined in claim 46, in which said components are disposed in a plurality of helical paths, there being a plurality of components simultaneously operating at each different diameter of said log.

References Cited

UNITED STATES PATENTS

| | | | |
|---|---|---|---|
| 3,304,970 | 2/1967 | Altosaar | 144—162 |
| 3,216,470 | 11/1965 | Nilsson | 144—172 |

FRANCIS S. HUSAR, Primary Examiner

U.S. Cl. X.R.

144—172, 220; 241—91